(12) United States Patent
Gruber (10) Patent No.: US 12,146,793 B2
(45) Date of Patent: *Nov. 19, 2024

(54) ADJUSTABLE DWELL TIME FOR MOTION DETECTOR BASED ON ACTIVITY

(71) Applicant: Ecolink Intelligent Technology, Inc., Carlsbad, CA (US)

(72) Inventor: Brandon Gruber, Carlsbad, CA (US)

(73) Assignee: Ecolink Intelligent Technology, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/307,970

(22) Filed: Apr. 27, 2023

(65) Prior Publication Data

US 2023/0349766 A1 Nov. 2, 2023

Related U.S. Application Data

(62) Division of application No. 17/382,520, filed on Jul. 22, 2021, now Pat. No. 11,650,102.

(51) Int. Cl.
*G01J 5/00* (2022.01)
*G01J 5/02* (2022.01)
*G08B 13/19* (2006.01)

(52) U.S. Cl.
CPC ............ *G01J 5/0025* (2013.01); *G01J 5/026* (2013.01); *G08B 13/19* (2013.01)

(58) Field of Classification Search
CPC .. G02B 6/3825; G02B 6/3831; G02B 6/3893; G02B 6/3869; G02B 6/3874; G02B 6/3821; G02B 6/3873
See application file for complete search history.

(56) References Cited

U.S. PATENT DOCUMENTS

| | | |
|---|---|---|
| 5,196,826 A | 3/1993 | Whiting |
| 5,344,068 A | 9/1994 | Haessig |
| 5,543,778 A | 8/1996 | Stouffer |
| 5,903,217 A | 5/1999 | Stanczak et al. |
| 5,986,357 A | 11/1999 | Myron et al. |
| 6,057,764 A | 5/2000 | Williams |
| 6,850,159 B1 | 2/2005 | Mudge |
| 6,909,921 B1 | 6/2005 | Bilger |
| 7,411,789 B2 | 8/2008 | Elwell et al. |
| 7,873,849 B2 | 1/2011 | Mucignat et al. |
| 8,665,090 B2 | 3/2014 | Bull |
| 8,842,008 B2 | 9/2014 | Bull |

(Continued)

FOREIGN PATENT DOCUMENTS

WO 2018141946 A1 8/2018

OTHER PUBLICATIONS

Notice of Allowance from U.S. Appl. No. 17/963,708, mailed Jul. 25, 2023, 9 pp.

(Continued)

*Primary Examiner* — Edwin C Gunberg
*Assistant Examiner* — Gisselle M Gutierrez
(74) *Attorney, Agent, or Firm* — Greenberg Traurig, LLP (57) ABSTRACT

A motion detector that can automatically adjust a dwell time used by the motion detector to prevent unnecessary transmissions as an activity level of an area increases or decreases. The motion detector determines the activity level in the area and if the activity level is increasing, the dwell time is reduced and vice-versa.

20 Claims, 6 Drawing Sheets

(56) References Cited

U.S. PATENT DOCUMENTS

| | | | |
|---|---|---|---|
| 9,836,069 B1 | 2/2017 | Nelmes et al. | |
| 9,589,446 B1 | 3/2017 | Dey | |
| 9,615,428 B2 | 4/2017 | King | |
| 9,756,607 B1 | 9/2017 | DeLuca | |
| 10,354,503 B1 | 7/2019 | Kostrun et al. | |
| 10,492,261 B2 | 11/2019 | Chen | |
| 10,557,965 B2 | 2/2020 | Lemarchand | |
| 10,650,652 B1 | 5/2020 | Weingart et al. | |
| 10,657,784 B1* | 5/2020 | Gordon | G08B 13/1966 |
| 10,937,257 B2 | 3/2021 | Davidson et al. | |
| 10,948,965 B2* | 3/2021 | Gruber | G01J 5/025 |
| 11,113,939 B1* | 9/2021 | Gruber | G08B 13/1966 |
| 11,227,476 B2* | 1/2022 | Pradhan | G08B 21/22 |
| 11,232,685 B1 | 1/2022 | Nixon | |
| 11,474,586 B2* | 10/2022 | Gruber | H04W 4/38 |
| 11,650,102 B2* | 5/2023 | Gruber | G01J 5/026 |
| | | | 250/340 |
| 11,836,030 B2* | 12/2023 | Gruber | G01J 5/0025 |
| 11,900,781 B2* | 2/2024 | Pradhan | G08B 21/0469 |
| 2002/0067272 A1 | 6/2002 | Lemelson et al. | |
| 2002/0089489 A1 | 7/2002 | Carpenter | |
| 2002/0175815 A1 | 11/2002 | Baldwin | |
| 2004/0090327 A1 | 5/2004 | Soloway | |
| 2005/0228317 A1 | 10/2005 | Mathews | |
| 2006/0125621 A1* | 6/2006 | Babich | G08B 29/14 |
| | | | 340/531 |
| 2008/0291036 A1 | 11/2008 | Richmond | |
| 2009/0086683 A1 | 4/2009 | Pendergrass et al. | |
| 2009/0146846 A1 | 6/2009 | Grossman | |
| 2009/0196206 A1 | 8/2009 | Weaver et al. | |
| 2010/0019911 A1 | 1/2010 | Chen | |
| 2012/0019644 A1 | 1/2012 | Hamabashiri et al. | |
| 2012/0023354 A1 | 1/2012 | Chino | |
| 2012/0297226 A1 | 11/2012 | Mucignat et al. | |
| 2012/0315839 A1 | 12/2012 | Mumcuoglu et al. | |
| 2013/0267253 A1 | 10/2013 | Case et al. | |
| 2014/0118592 A1 | 5/2014 | Yoon et al. | |
| 2014/0191862 A1 | 7/2014 | Haines | |
| 2015/0113338 A1 | 4/2015 | Maruyama et al. | |
| 2015/0127662 A1 | 5/2015 | Yi | |
| 2015/0308706 A1 | 10/2015 | Bunker et al. | |
| 2016/0003493 A1 | 1/2016 | Katz | |
| 2016/0062443 A1 | 3/2016 | Saito | |
| 2016/0095192 A1 | 3/2016 | Vangeel et al. | |
| 2016/0126733 A1 | 5/2016 | Hick et al. | |
| 2016/0150121 A1 | 5/2016 | Idehara | |
| 2016/0195924 A1 | 7/2016 | Weber | |
| 2016/0241997 A1 | 8/2016 | Lucas | |
| 2016/0291966 A1 | 10/2016 | Johnson | |
| 2017/0013069 A1 | 1/2017 | Grohman | |
| 2017/0039844 A1 | 2/2017 | Malhotra et al. | |
| 2017/0060960 A1 | 3/2017 | Kim et al. | |
| 2017/0092112 A1 | 3/2017 | Khazanov et al. | |
| 2017/0160428 A1 | 6/2017 | Kumar | |
| 2017/0181249 A1 | 6/2017 | Takahashi | |
| 2017/0316680 A1 | 11/2017 | Lamb et al. | |
| 2017/0358182 A1 | 12/2017 | El-Iraki et al. | |
| 2018/0012467 A1 | 1/2018 | Chen | |
| 2018/0074152 A1 | 3/2018 | Bowden | |
| 2018/0268673 A1* | 9/2018 | Amir | G08B 13/19 |
| 2018/0322752 A1 | 11/2018 | Chen | |
| 2018/0338472 A1 | 11/2018 | Kinsley et al. | |
| 2019/0141812 A1 | 5/2019 | Chen | |
| 2019/0293315 A1 | 9/2019 | Ruiz | |
| 2020/0209943 A1* | 7/2020 | Gruber | G01J 5/028 |
| 2020/0211340 A1 | 7/2020 | Min | |
| 2020/0294382 A1* | 9/2020 | Pradhan | G08B 21/0469 |
| 2020/0333868 A1* | 10/2020 | Gruber | G06F 9/3004 |
| 2021/0278890 A1* | 9/2021 | Gruber | G01J 5/0025 |
| 2021/0280029 A1* | 9/2021 | Gruber | G08B 13/19634 |
| 2021/0366253 A1* | 11/2021 | Gruber | G08B 13/19673 |
| 2022/0139189 A1* | 5/2022 | Pradhan | G01P 13/00 |
| | | | 700/9 |
| 2023/0021573 A1* | 1/2023 | Gruber | G01J 5/026 |
| 2023/0029713 A1* | 2/2023 | Gruber | G08B 13/1961 |

OTHER PUBLICATIONS

Extended European search report issued on European patent application No. 20770681.3, dated Nov. 7, 2022, 7 pages.
International Search Report and Written Opinion issued on PCT application No. PCT/US17/54706, dated Oct. 19, 2017, 9 pages.
International Search Report and Written Opinion issued on PCT application No. PCT/US19/57130, dated Jan. 16, 2020, 10 pages.
International Search Report and Written Opinion issued on PCT application No. PCT/US20/21177, dated Jun. 15, 2020, 13 pages.
International Search Report and Written Opinion issued on PCT application No. PCT/US21/19185, dated Mar. 26, 2021, 7 pages.
Non-final Office Action from U.S. Appl. No. 17/393,928, mailed May 25, 2023, 13 pp.
Non-final Office Action from U.S. Appl. No. 17/578,112, mailed Dec. 22, 2022, 15 pp.
Non-Final Office Action issued in U.S. Appl. No. 17/963,708, dated Feb. 16, 2023, 11 pgs.
Extended Search Report from European application number 21765088.6, dated Jun. 28, 2023, 7 pp.
Final Office Action in U.S. Appl. No. 17/578,112, mailed Jun. 23, 2023, 12 pp.
International Search Report and Written Opinion issued on PCT application No. US22/37533, dated Aug. 16, 2022, 8 pages.
Final Office Action from U.S. Appl. No. 17/393,928, dated Sep. 13, 2023, 13 pp.
Office Action from European application No. 19907204.2, dated Aug. 22, 2023, 6 pp.
Office Action from European application No. 20770681.3, dated Aug. 21, 2023, 7 pp.
Office Action from European application No. 20770681.3, dated Mar. 21, 2024, 6 pp.
Non-final Office Action from U.S. Appl. No. 18/505,270, dated Jun. 5, 2024, 10 pp.
Extended Search Report from European application No. 24176885.2, dated Jul. 5, 2024, 12 pp.

* cited by examiner

ADJUSTABLE DWELL TIME FOR MOTION DETECTOR BASED ON ACTIVITY

I. CROSS-REFERENCE TO RELATED APPLICATIONS

This application is a divisional of U.S. patent application Ser. No. 17/382,520, filed on Jul. 22, 2021.

II. FIELD OF THE INVENTION

The present invention relates to home security and, more particularly, to a system, method and apparatus to extend battery life for motion detectors.

III. DESCRIPTION OF RELATED ART

Home security systems are very popular in the United States and abroad. Such home security systems typically comprise a security panel and a number of sensors distributed around the home to detect unauthorized entry and/or movement inside the home. For example, a home may have all of its doors and windows monitored by installing a wireless door/window sensor onto each door and window of the home to detect unauthorized entry, and one or more motion sensors installed at one or more points inside the home for detecting unauthorized movement within the home. Each of the sensors may transmit a wireless signal to the security panel, where the security panel may take further action once a signal has been received from one of the sensors, such as to sound a siren inside the home or contact a remote monitoring facility.

In addition to the popularity of home security systems, home monitoring and control systems are now becoming widespread. Such systems allow users to monitor their home security systems, turn lights on and off remotely, lock and unlock doors remotely, as well as to better control home heating and air conditioning systems. In the latter category, battery-powered, home occupancy sensors are being used to automatically control operation of heating and air conditioning systems when the sensors detect the presence of an occupant or not.

Motion sensors utilize a "dwell time", or delay time, that prevents transmissions once movement is detected. Without this, as a person, for example, moves across a room, a motion sensor might continuously transmit a "motion detected" signal, needlessly draining its battery well before an expected battery life.

If the dwell time is set too long, for example 3 minutes or longer, a motion sensor may not capture all motion events. For example, an authorized person may move through a room, causing the motion sensor to transmit a motion detected signal. However, if a burglar enters the room within the dwell time, the motion sensor will not transmit another motion detected signal.

If the dwell time is set too short, a motion sensor will transmit more often when continuous motion is detected. For example, if the dwell time is set to 15 seconds, a motion detector would transmit a motion detected signal every 15 seconds while motion is present. This needlessly drains the battery.

It would be desirable to overcome the limitations of a fixed dwell time in security motion detectors in order to maximize battery life.

SUMMARY

A system, method and apparatus for automatically adjusting a dwell time of a motion detector based on detected activity in an area monitored by the motion detector. In one embodiment, a motion detector is described, comprising a detector for detecting a presence of a person in an area, a memory for storing processor-executable instructions and a dwell time, the dwell time comprising a minimum time period in which to transmit successive motion detection signals, a transmitter for transmitting the motion detection signals, and a processer coupled to the detector, the memory and the transmitter, for executing the processor-executable instructions that causes the motion detector to determine, by the processor, a level of activity in the area, based on the level of activity, adjust, by the processor, the dwell time to a new dwell time, and store, by the processor, the new dwell time in the memory.

In another embodiment, a method is described for automatically adjusting a dwell time of a motion detector based on detected activity in an area monitored by the motion detector, comprising determining, by a processor of the motion detector, a level of activity in the area, based on the level of activity, adjusting, by the processor, the dwell time to a new dwell time, and storing, by the processor, the new dwell time in the memory.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION

This disclosure describes a motion detector that automatically adjusts its "dwell time" based on activity levels detected in an area monitored by the motion detector. A "dwell time", as described herein, comprises a time period during which the motion detector does not transmit a "motion detection" signal after detecting motion. It should be understood that throughout this disclosure, the terms "level", "rate" and "frequency" may be used interchangeably.

Figure 1:
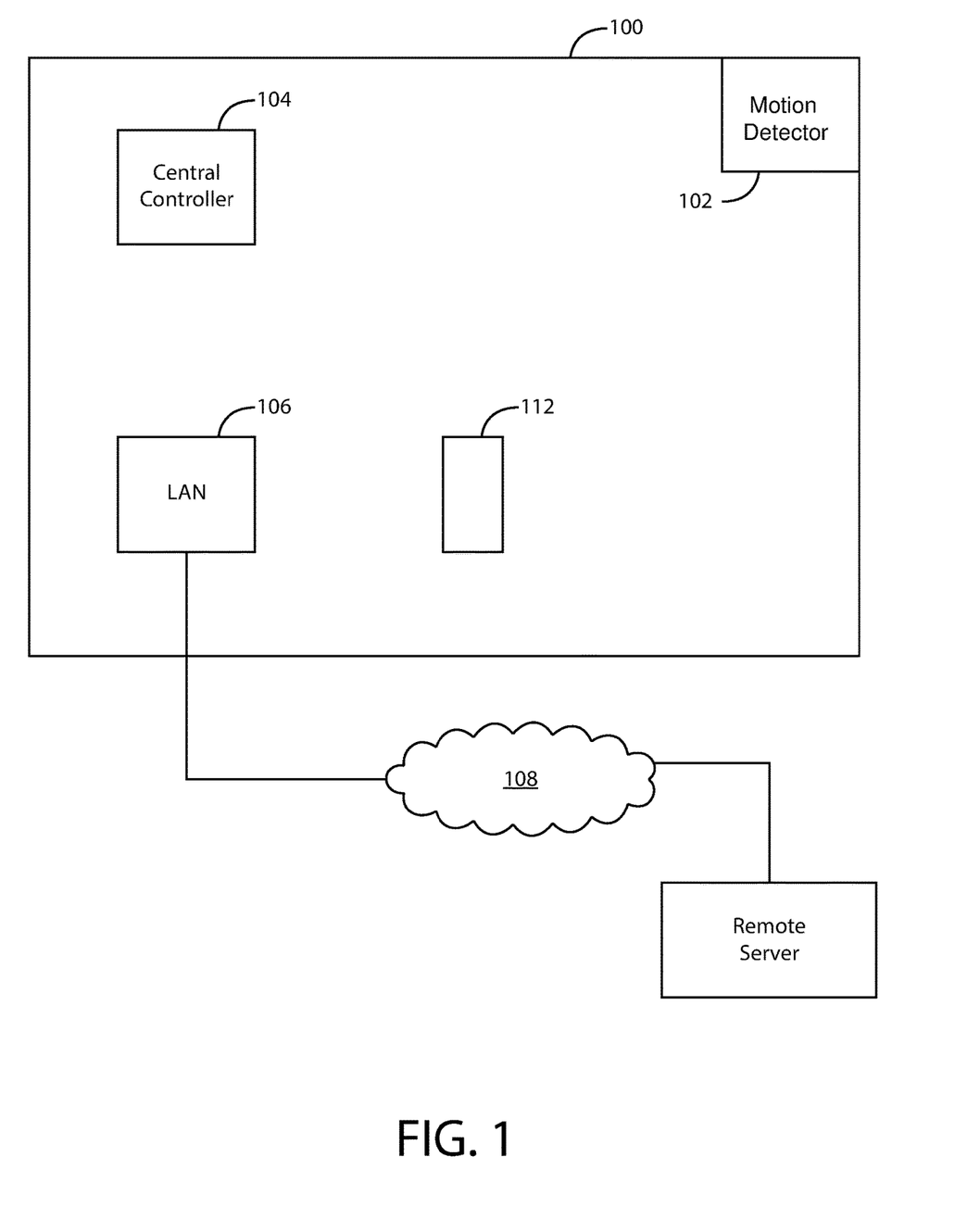
FIG. 1 is a top, plan view of a home or business monitored by a security system comprising a motion detector 102 configured to automatically adjust a dwell time of the motion detector based on detected activity in an area monitored by the motion detector.

FIG. 1 illustrates a top, plan view of a home or business monitored by a security system comprising a motion detector 102 used to monitor an area 100 in the home or business and central controller 104. In this example, the security system comprises only motion detector 102 and central controller 104. However, security systems typically comprise additional components, such as one or more door/window sensors, garage tilt sensors, glass break sensors, sirens, etc. These components have been omitted in order to focus on motion detector 102.

Area 100 generally comprises a room, hallway, entryway, or some other portion of a residence or business. Motion detector 102 comprises a sensor/transmitter combination for determining the presence of one or more persons in area 100, and for transmitting "motion detected" signals wirelessly to central controller 104 when motion is detected. Motion detector 102 may comprise a battery-powered motion sensor using passive infra-red (PIR) detection techniques, as known in the art, to detect infra-red heat as a person moves across area 100. Motion detector 102 may, alternatively or in combination, comprise an occupancy sensor, used to determine the presence of one or more persons in area 100 using techniques such as ultrasonic, infra-red, thermal, or other well-known techniques to determine if a person is occupying area 100. Unlike traditional motion (PIR) sensors, occupancy sensors generally do not require movement of a person in order to detect their presence.

Motion detected signals are transmitted to central controller 104, upon detection of a person in area 100, in accordance with a dwell time stored within motion detector 102, as will be explained in greater detail later herein. In one embodiment, the dwell time is a static time period following a detection of motion. In another embodiment, the dwell time is a "sliding" time period, i.e., a fixed time period that is reset each time that motion is detected. For example, if the dwell time is 1 minute, and motion is detected, a software timer is started that determines if no further movement occurs during the dwell time. If no movement is detected during the dwell time, motion detector 102 will transmit a "motion detected" signal the next time it detects motion. On the other hand, during the dwell time, if further movement is detected, motion detector 102 will refrain from transmitting a "motion detected" signal and reset the software timer to the dwell time, where motion detector 102 will not transmit a "motion detected" signal from the time the that the further movement is detected until the end of the dwell time, assuming no additional movement is detected during this time period.

Central controller 104 comprises a home security panel, gateway, hub or some other device that monitors motion detector 102, as well as other sensors and/or home monitoring and control devices, installed within area 100 or other areas of a home or business. Examples of central controller 104 include a GC3 Security & Control panel sold by Nortek Security and Control, Inc., a base station sold as part of an alarm security kit by Ring, Inc., a Pulse® interactive touch screen panel sold by ADT, Inc. In other embodiments, controller 104 may not be used. In these embodiments, motion detector 102 is monitored by a remote server 110 in communication with motion detector 102 via a wide-area network 108, such as the Internet, and a local-area network (LAN) 106. In the remaining disclosure, any reference to central controller 104 may include reference to remote server 110. In some embodiments, central controller 104 comprises both security and home monitoring and control functionality. Finally, central controller 104 may communicate with remote server 110 via local-area network 106 and wide-area network 108 where central controller 104 lacks independent means to send alerts or other information externally to area 100.

When central controller 104 receives a signal from motion detector 102 when the security system is in an armed mode of operation, or some other security or home monitoring sensor, central controller 104 may perform one or more actions, such as to contact a remote, security monitoring facility (not shown) via wide-area network 108, or by some other means, such as via cellular communication technology. Alternatively, or in addition, central controller 104 may cause a siren (not shown) inside of area 100, or elsewhere in another location inside a home or business, to sound, and/or a strobe light (not shown) to flash.

The dwell time and/or a rate of change of the dwell time may be programmed remotely using a personal communication device 112. Personal communication device 112 may comprise a fixed or mobile computing device, such as a laptop or desktop computer, or it may comprise a mobile phone, tablet computer, wearable device, or some other device capable of wireless communications with motion detector 102, either directly or indirectly via local-area network 106 and/or wide-area network 108 (when personal communication device 112 is located outside of area 100 and out of range of local-area network 106) and also offering a user interface for monitoring and/or programming the dwell time and/or rate of change. Personal communication device 112 is configured to run an executable software program, or "app", that allows a user to perform these actions. In one embodiment, personal communication device 112 communicates with remote server 110, which stores account information for thousands, or millions, or users, each who have one or more motion detectors in their respective homes or businesses. In this embodiment, a user account may store a current dwell time of motion detector 102 or a dwell time rate of change metric, which indicates how quickly the dwell time will change, based on an activity level in area 100, as will be explained later herein. The dwell time and/or rate of change may then be provided to motion detector 102, where it is stored in memory.

Figure 2:
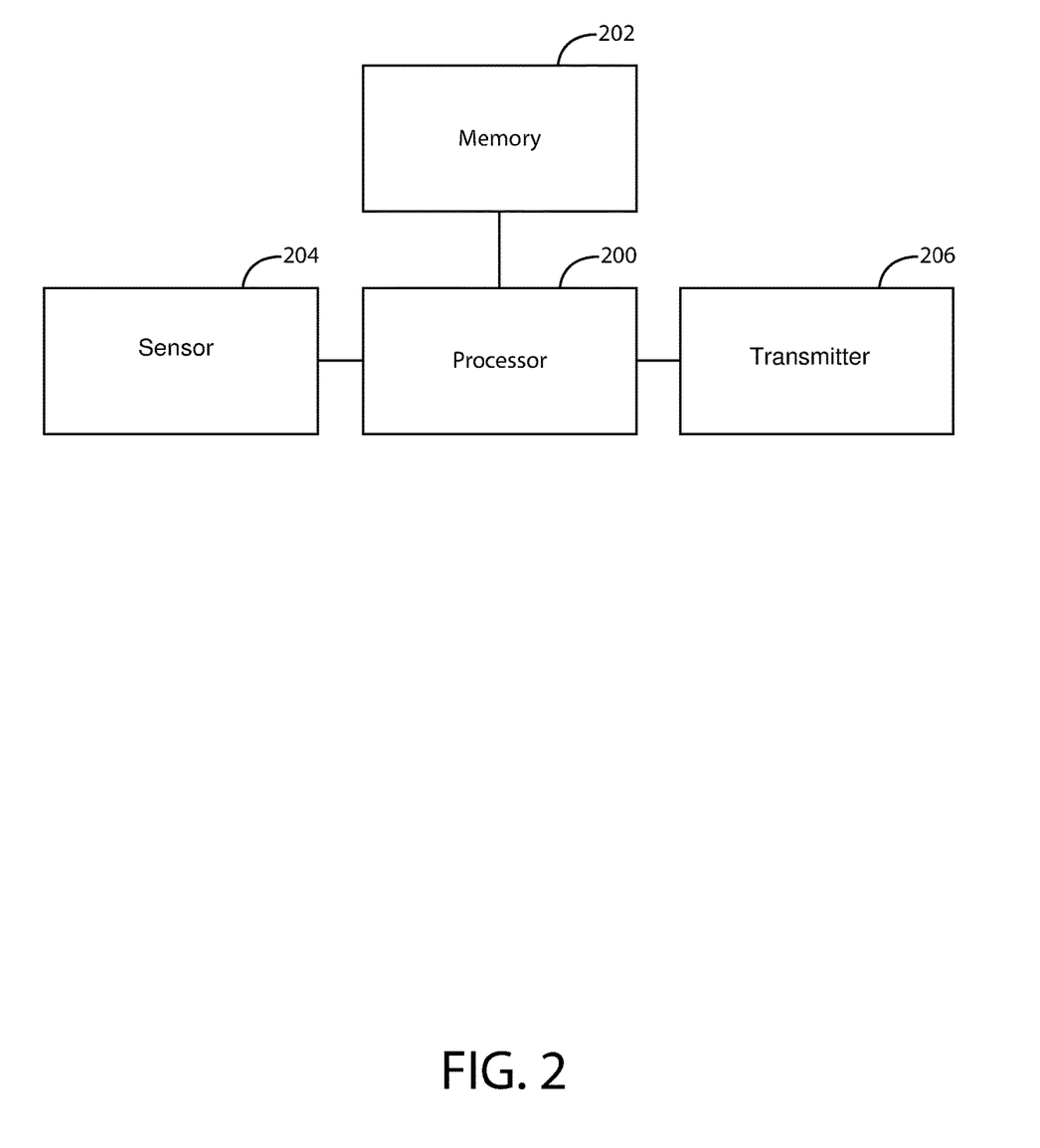
FIG. 2 is a functional block diagram of the motion detector as shown in FIG. 1.

FIG. 2 is a functional block diagram of one embodiment of motion detector 102. In this embodiment, motion detector 102 comprises a processor 200, a memory 202, a sensor 204, and a transmitter 206. It should be understood that the functional blocks may be connected to one another in a variety of ways, that additional function blocks may be used (for example, amplification or filtering), and that not all functional blocks necessary for operation of motion detector 102 are shown for purposes of clarity, such as a power supply.

Processor 200 is configured to provide general operation of motion detector 102 by executing processor-executable instructions stored in memory 202, for example, executable code. Processor 200 typically comprises a general purpose processor, such as an ADuC7024 analog microcontroller manufactured by Analog Devices, Inc. of Norwood Massachusetts, although any one of a variety of microprocessors, microcomputers, microcontrollers, and/or custom ASICs selected based on size, cost, power consumption, computing power, and/or other factors.

Memory 202 is coupled to processor 200 and comprises one or more non-transitory, information storage devices, such as RAM, ROM, flash memory, or virtually any other type of electronic, optical, or mechanical information storage device. Memory 202 is used to store the processor-executable instructions for operation of motion detector 102 as well as any information used by processor 200, such as a dwell time that defines how often motion detector 102 may transmit when a person is detected and/or a dwell time rate of change, which defines how quickly the dwell time will change based on the level of activity in area 100. Memory device 202 could, alternatively or in addition, be part of processor 200, as in the case of a microcontroller comprising on-board memory.

Sensor 204 is coupled to processor 200 and comprises a sensor and related circuitry and, in some embodiments, firmware, to detect the presence or absence of one or more persons in area 100. Sensor 204 may comprise one or more passive infra-red (PIR) detectors (for detecting motion of an infra-red emitting body), ultrasonic detectors (for detecting a doppler shift from a reflected body), heat or thermal detectors (for determining a temperature change), carbon dioxide sensors (for detecting the presence of carbon dioxide), microwave sensors (for detecting a doppler shift from a reflected body), a keycard detector (for determining when a hotel guest has inserted a hotel key card), and/or a camera (using firmware to detect a shape in the form of a person).

Transmitter 206 is coupled to processor 200 and comprises circuitry necessary to transmit wireless signals from central controller 104, local-area network 106 and/or personal communication device 112. Such circuitry is well known in the art and may comprise BlueTooth, Wi-Fi, Z-wave, Zigbee, X-10, RF, optical, or ultrasonic circuitry, among others. In some embodiments, transmitter 206 additionally comprises a wireless receiver for receiving signals from central controller 104, local-area network 106 and/or personal communication device 112, such as programming commands to modify the dwell time rate of change.

Figure 3:
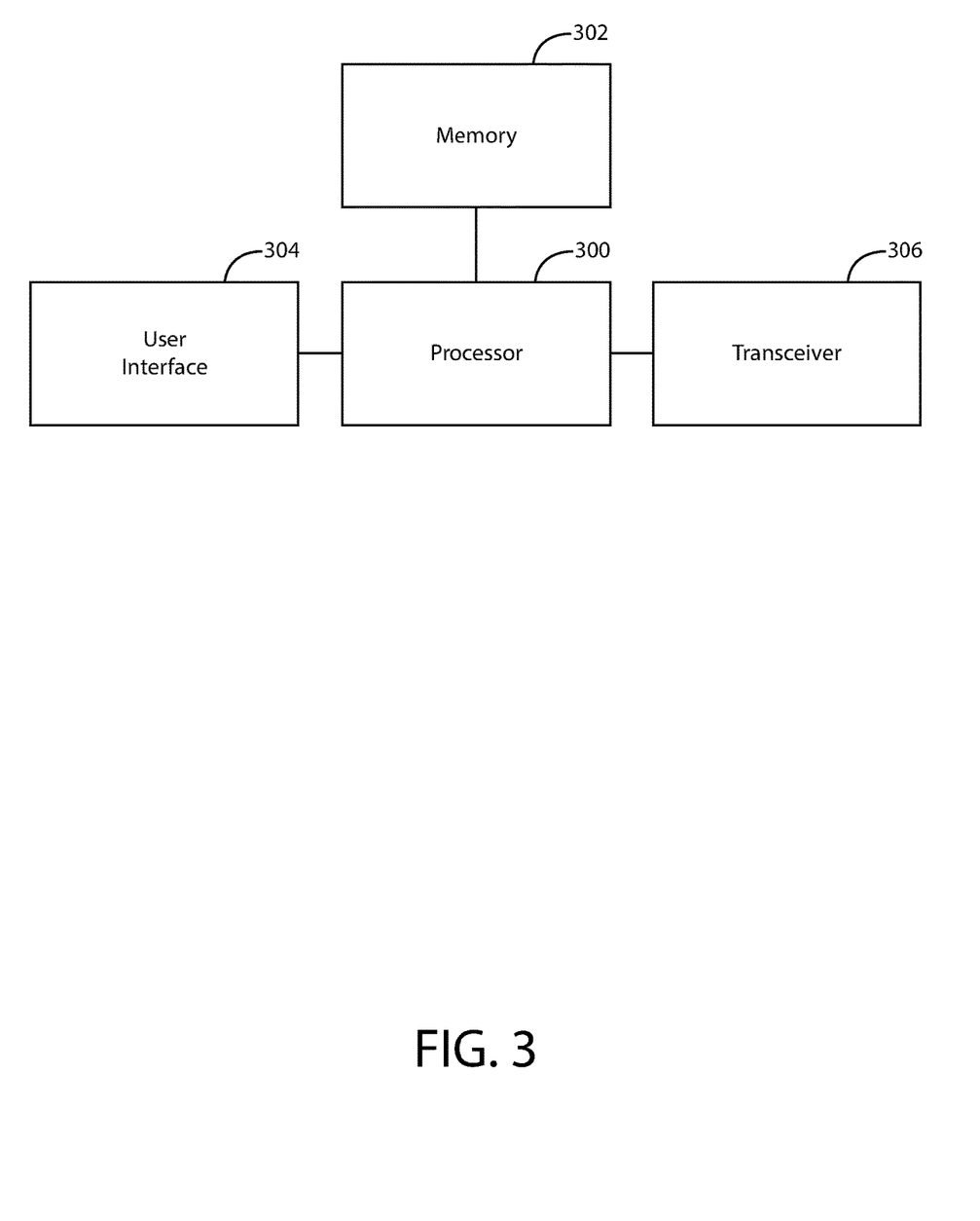
FIG. 3 is a functional block diagram of a personal communication device used to monitor and/or configure the motion detector as shown in FIG. 1.

FIG. 3 is a functional block diagram of one embodiment of personal communication device 112, showing processor 300, memory 302, user interface 304, and one or more transmitters 306. It should be understood that the functional blocks shown in FIG. 3 may be connected to one another in a variety of ways, and that not all functional blocks necessary for operation of personal communication device 112 are shown (such as a power supply), for purposes of clarity.

Processor 300 is configured to provide general operation of personal communication device 112 by executing processor-executable instructions stored in memory 200, for example, executable code. Processor 300 typically comprises one or more microprocessors, microcontrollers, or custom ASICs that provide communications functionality to personal communication device 112 as well as to execute instructions that provide an ability for personal communication device 112 to monitor and configure motion detector 102 to change the dwell time and/or change the dwell time rate of change.

Memory 302 is coupled to processor 300 and comprises one or more non-transient information storage devices, otherwise referred to as one or more processor-readable mediums, such as RAM, flash memory, or virtually any other type of electronic, optical, or mechanical information storage device. Memory 302 is used to store the processor-executable instructions for general operation of personal communication device 112 (for example, communication functionality), one or more dwell times, and in some embodiment, a dwell time rate of change.

User interface 304 is coupled to processor 300 and allows a user to monitor and configure motion detector 102. User interface 304 may comprise one or more pushbuttons, touch-screen devices, electronic display devices, lights, LEDs, LCDs, biometric readers, switches, sensors, keypads, microphones, speakers, and/or other human interface devices that present indications to a user or generate electronic signals for use by processor 300 upon initiation by a user. A very popular user interface today is a touchscreen device.

Transceiver 206 comprises circuitry necessary to wirelessly transmit and receive information to/from personal communication device 112, such as one or more of a cellular transmitter, a Wi-fi transmitter, a Bluetooth transmitter, a cellular data transmitter, an Ethernet adapter, and/or some other type of wireless means for communications. In some embodiments, more than one transmitter is present, for example, a cellular transmitter and a Wi-Fi transmitter. Such circuitry is generally well known in the art.

Figure 4A:
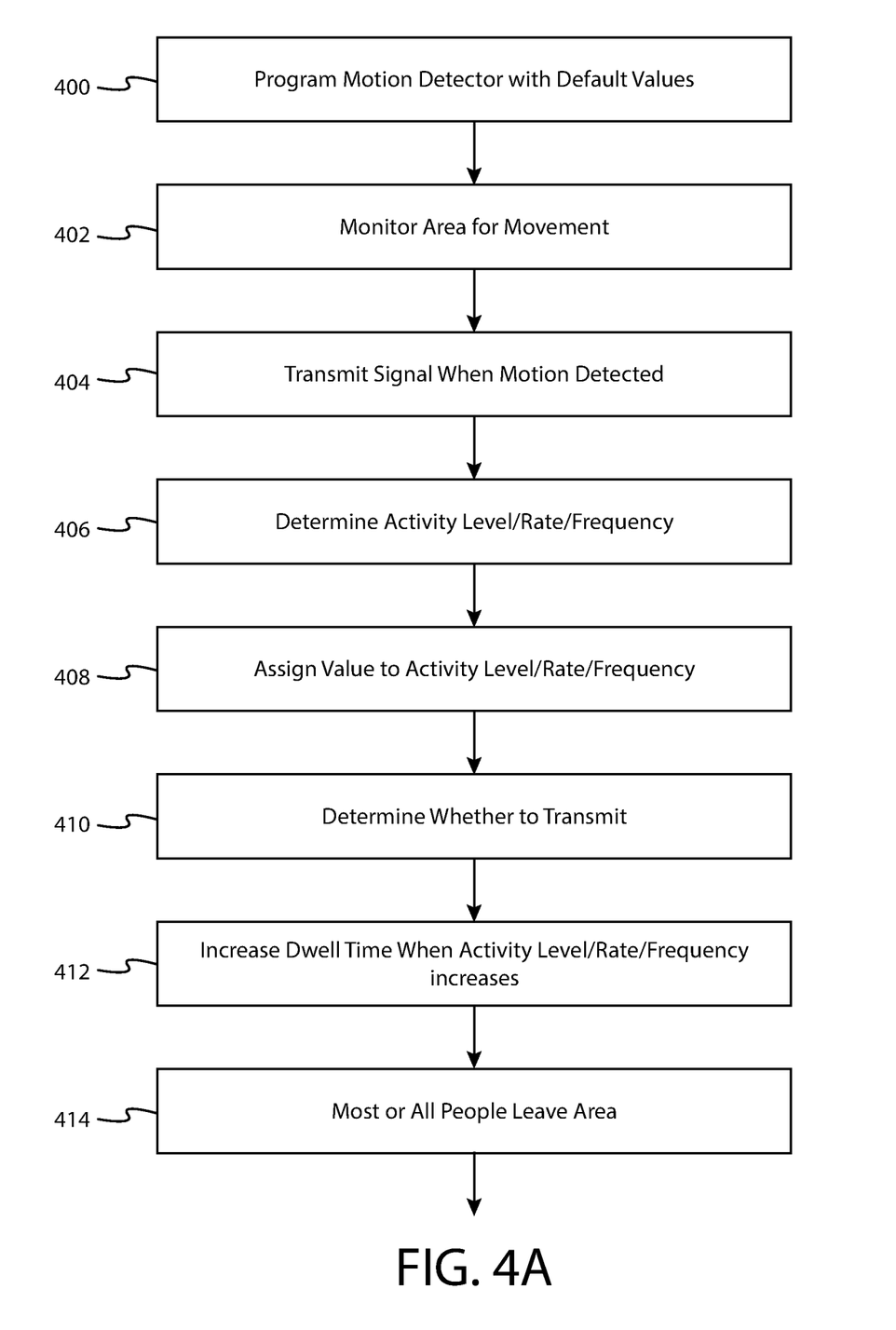
FIG. 4 is a flow diagram illustrating one embodiment of a method for automatically adjusting a dwell time of a motion detector based on detected activity in an area monitored by the motion detector.
Figure 4B:
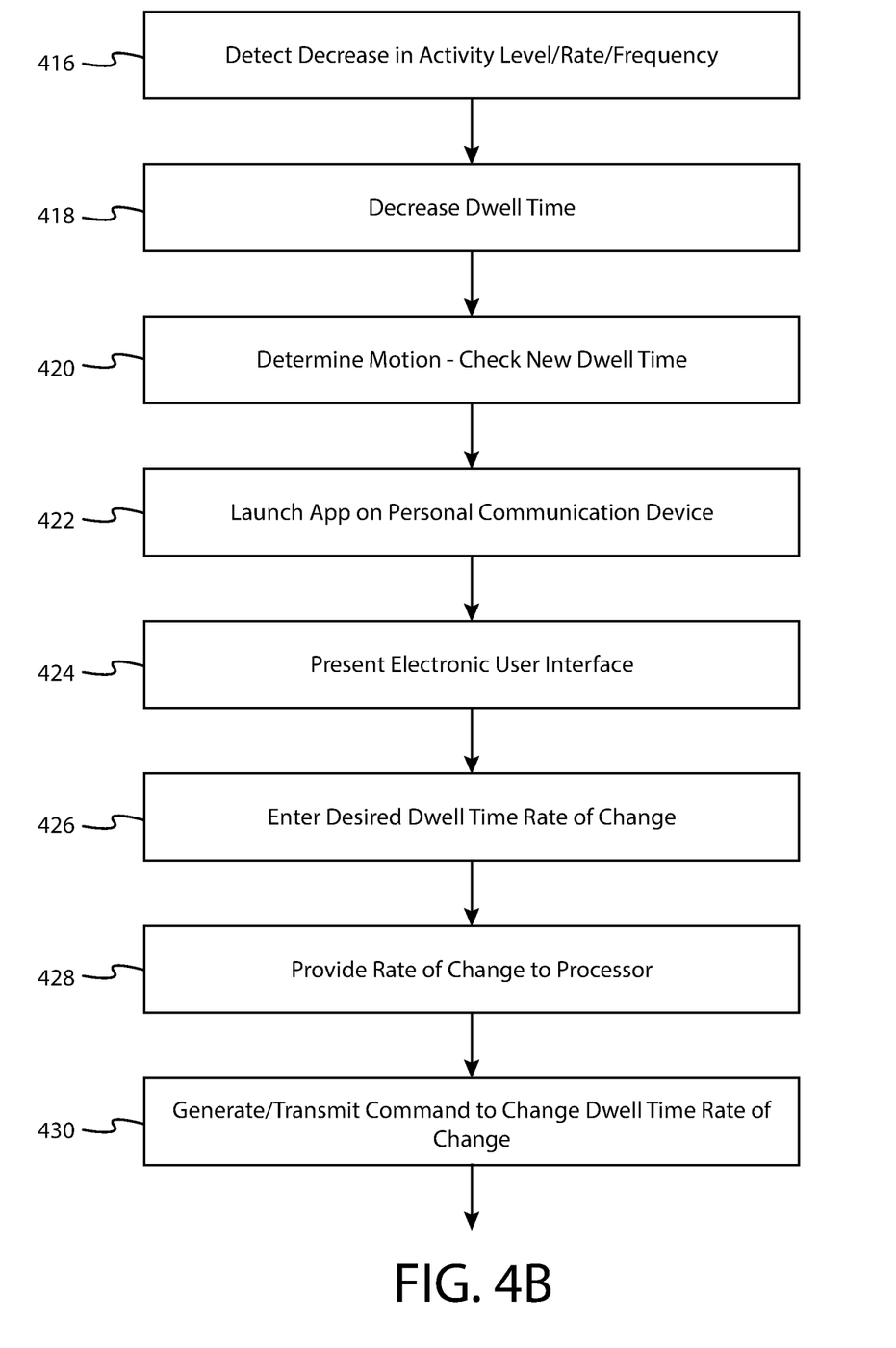
Figure 4C:
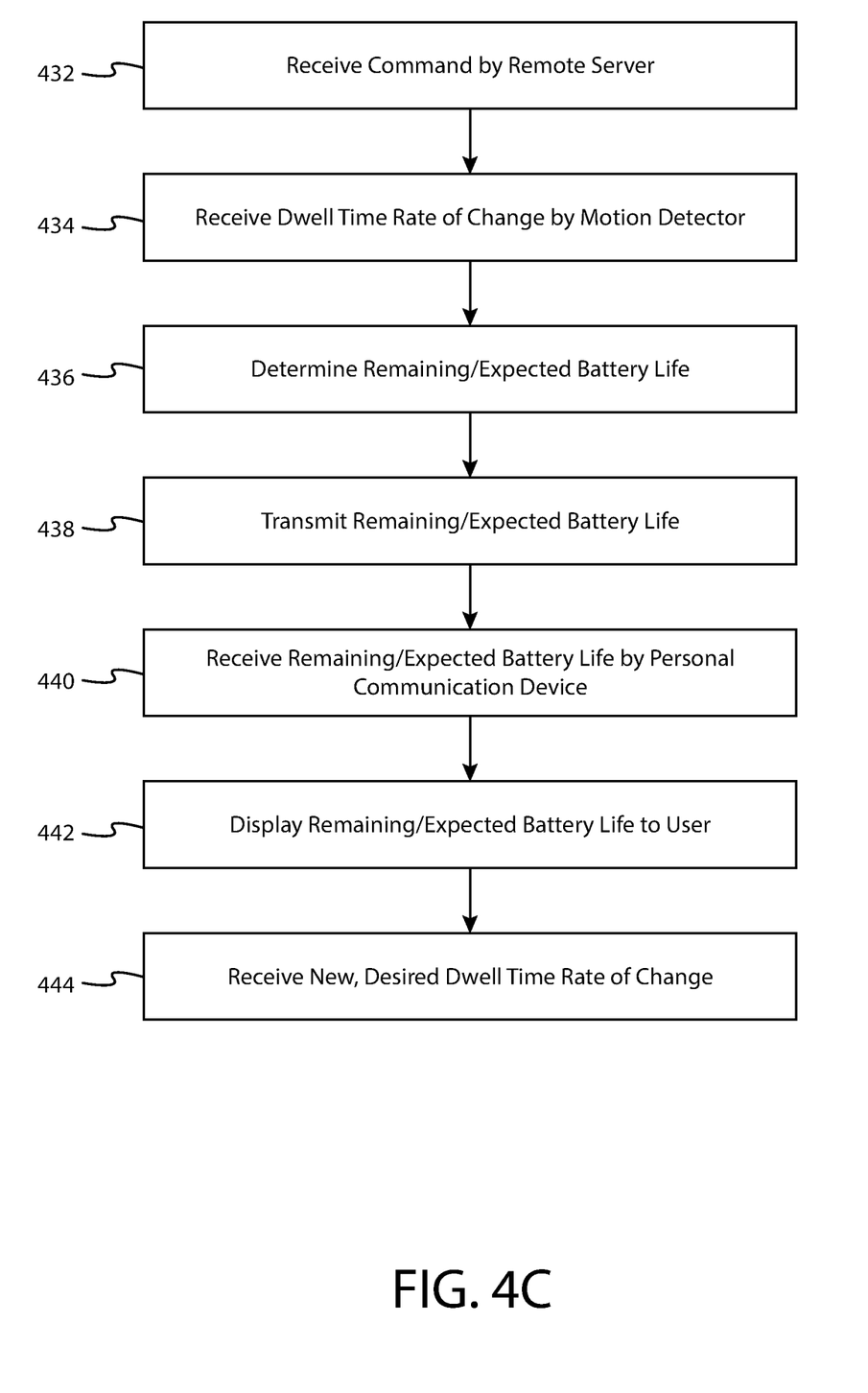

FIG. 4 is a flow diagram illustrating one embodiment of method, or algorithm, performed by motion detector 102 and personal communication device 112, for automatically changing the dwell time of motion detector 102 based on activity levels occurring in area 100. It should be understood that in some embodiments, not all of the steps shown in FIG. 4 are performed and that the order in which the steps are carried out may be different in other embodiments. It should be further understood that some minor method steps have been omitted for purposes of clarity.

The process begins at block 400, where motion detector 102 is programmed with a default dwell time and, in one embodiment, a default dwell time rate of change. This typically occurs during the manufacturing process. A typical default dwell time is one minute.

At block 402, motion detector 102 monitors area 100 for movement of a person by processor 200 evaluating signals from sensor 204. Sensor 204 typically generates a signal when motion is detected and provides it to processor 200. Processor 200 evaluates the signal to determine whether movement is present in area 100 using techniques well-known in the art.

At block 404, if movement is detected, processor 200 causes transmitter 206 to transmit a "movement detected" signal.

At block 406, processor 200 determines an activity level, frequency or rate, associated with area 100. An "activity level" comprises an indication of activity in area 100, expressed either at a level, rate or frequency. For example, if a single person enters area 100, sensor 204 will generate a signal and provide it to processor 200. Processor 200, in turn, processes the signal and determines that movement has been detected in area 100. The person who entered area 100 may continue to move around in area 100 over time. As a result, sensor 204 continues to generate signals in response to sensing this additional movement and provides those signals to processor 200 for processing. Processor 200 may make multiple determinations during this time period, based on the signals, that additional movement is occurring in area 100, i.e., determine an activity level based on the frequency of motion determinations made by processor 200.

In another example, multiple people may enter and occupy area 100. Motion may be sensed by motion detector 102 as explained above after a first person enters area 100. As additional people enter area 100, and as these people move around area 100, sensor 204 may generate numerous signals over time as movement of each person is detected. As such, processor 200 will receive and process these signals, determining that movement is occurring frequently in area 100, such as determining that movement has been detected every second for a predetermined number of seconds, such as 10 seconds, or determining that movement has occurred a number of times that exceeds a predetermined threshold, such as, such as 3 movement detections over a 20 second time period. In these embodiments, processor 200 determines an activity level based on the frequency of motion determinations made by processor 200. In another embodiment, processor 200 determines an activity level by periodically checking sensor 204 to see if sensor 204 has determined any movement in area 100 since the last time processor 200 checked sensor 204. For example, processor 200 may evaluate sensor 204 every 2 minutes, and determine an activity level of "1" when activity is detected that meets or exceeds a predetermined consecutive number of times, such as three consecutive times, or a predetermined number of times within a predetermined time period, such as 2 times every 3 minutes.

At block 408, in some embodiments, processor 200 assigns a value to the activity level. For example, a "1" can be assigned when the activity level exceeds a first level, and a "0" can be assigned when little or no activity is sensed. In another embodiment, processor 200 may assign a value between 1 and 10, or 1 in 5, etc., to indicate the activity level. In this embodiment, memory 202 may store a number of activity levels based on the frequency of motion detections. For example, the numerical value assigned by processor 200 when no movement is detected over a predetermined time period may be the lowest value, i.e., "1" in the two examples provided above, the numerical value increasing as the frequency of movement is detected. The numerical value may be stored in memory 202 representing the current activity level.

At block 410, after detecting a second instance of activity when additional movement is detected, as described above, processor 200 determines whether to cause transmitter 206 to transmit a "movement detected" signal by evaluating the current dwell time. In this example, the dwell time is stored in memory 202 as 1 minute. Therefore, if the second instance of additional movement is detected within a 1 minute period, processor 200 does not cause transmitter 200 to transmit a "movement detected" signal.

At block 412, in response to determining the increased activity level or rate in area 100, processor 200 may automatically increase the default dwell time by a predetermine time when the activity level (i.e., frequency of detected movement) exceeds a predetermined threshold. For example, if the frequency of detected movement exceeds one per 30 second time period, processor 200 may increase the default dwell time to 2 minutes. If additional movement is detected within another predetermined time period, such as in the following 2 minutes, processor 200 may again increase the dwell time, for example to 3 minutes. Note that the amount of dwell time increase is not limited to linear values. For example, upon detecting additional movement in the following 2 minute time period, processor 200 may increase the dwell time to 5 minutes. As the dwell time increases, motion detector 102 transmits fewer "motion detected" signals, thereby increasing battery life.

In another embodiment, processor 200 may increase the dwell time continuously at a dwell time rate of change stored in memory 202, i.e., change the dwell time a predetermined time while the activity level exceeds a predetermined threshold. For example, the dwell time rate of change may be stored in memory 202 is 1 minute of dwell time change every two minutes that the activity level exceeds 2 determinations per minute, processor 200 will increase the dwell time by 1 minute every minute, typically until the dwell time reaches a maximum value, such as 30 minutes.

At block 414, in an example where multiple people are in area 100, most or all but one of the people may leave area 100.

At block 416, as a result of most or all but one person leaving the area, processor 200 detects a decrease in the activity level in area 100. For example, after the people have left area 100, processor may only detect instances of movement sporadically, for example once every two minutes, or 3 times over a 5 minute time period.

At block 418, in response to determining a decreased activity level or rate in area 100, processor 200 decreases the dwell time. For example, if the number of motion detections per time decreases below a predetermined threshold, such as one detection every two minutes, processor 200 may decrease the dwell time by a fixed amount, such as from 10 minutes to 2 minutes, or to a fixed value, such as 3 minutes. Multiple predetermined thresholds may be stored in memory 202, each indicating a particular activity level or frequency, each predetermined threshold associated with a particular dwell time value. For example, for an activity level of 10 detections every minute, the associated dwell time could be 8 minutes, and for an activity level of 1 detection every two minutes, the associated dwell time could be 5 minutes.

In another embodiment, processor 200 could reduce the dwell time based on the rate of change of the activity level. For example, when the activity level drops 10%, processor 200 may decrease the dwell time by 10% or by some other figure not associated with the percentage drop in detections. Additionally, the decrease may not be linear. For example, if the activity level drops by 10%, processor 200 may decrease the dwell time by 20%, and if the activity drops another 10%, processor 200 may decrease the dwell time by 30%.

In yet another embodiment, processor 200 may decrease the dwell time continuously at a dwell time rate of change stored in memory 202, i.e., change the dwell time a predetermined time while the activity level remains below a predetermined threshold. This dwell rate may be the same or different than the dwell rate of change as described above. Processor may continue continuously changing the dwell time until it reaches 0 or some other relatively small time period, such as 15 seconds.

At block 420, when processor 200 determines movement as a result of evaluating signals from sensor 204, processor 200 checks memory 202 to determine a current value of the dwell time, as it may have changed since the last time processor 200 caused transmitter 206 to transmit a "motion detected" signal. Processor 200 refrains from causing transmitter 206 to transmit a "motion detected" signal when an elapsed time from a previous transmission does not exceed the current dwell time.

At block 422, a user may launch an application on personal communication device 112 to monitor and/or configure motion detector 102. The application may initiate a session with remote server 110 to access an account where information pertaining to motion detector 102, and associated information such as an owner's name, address, phone number, account number, email address, etc., may be stored. In other embodiments, personal communication device 112 communicates with motion detector 102 either directly (i.e., using Bluetooth or BLE), or indirectly (i.e., via local-area network 106).

At block 424, processor 300 of personal communication device 112 may present an electronic user interface for monitoring and/or configuring motion detector 102 to the user via user interface 304. The electronic user interface is typically a graphical user interface, allowing the user to determine a status of motion detector 102 (such as whether motion detector 102 is connected to central controller 104, an operating mode of motion detector (i.e., "walk test", normal), a current setting for the dwell time, a current setting for the dwell time rate of change, an estimated battery life of motion detector 102, etc.) and also to allow the user to make certain modifications to motion detector 102 (i.e., to change the dwell time and/or to change the dwell time rate of change, in embodiments where processor 200 changes the dwell time based on the dwell time rate of change). The electronic user interface may comprise one or more drop-down menus, slider bars, entry boxes, etc. to allow the user to change the dwell time and/or dwell time rate of change.

At block 426, the user may modify the dwell time rate of change, or any of the thresholds that help determine various activity levels, using the user interface displayed on user interface 304. The user may wish to decrease the dwell time rate of change, for example, if motion detector 102 is transmitting too frequently, or to increase the dwell time rate of change when motion detector 102 is failing to transmit "motion detected" signals as quickly as desired by the user. For example, if a current dwell time rate of change is 1 minute of change every 2 minutes that an activity level exceeds a predetermined threshold, the user may desire that the dwell rate of change be set to 1 minute of change every minute that the activity level exceeds the predetermined threshold, or to 20 seconds of dwell time change for every two minutes that the activity level exceeds the predetermined level.

At block 428, an indication of the new dwell time rate of change, and/or change in threshold level(s), of is provided from user interface 304 to processor 300.

At block 430, processor 300, in turn, generates a command to change the dwell time rate of change, or threshold level(s), and causes the command to be transmitted to remote server 110 and/or motion detector 102, via transmitter 306, which may include an identification of a particular motion detector 102 to be modified. The command may include the new dwell time rate of change, or the new dwell time rate of change may be transmitted in a separate message or command, or the, new threshold level(s). In another embodiment, the changes are not provided to remote server 110 and/or motion detector 102 until the user is satisfied that the new dwell time rate of change, or changes to the threshold value(s) will not have undesired battery life implications, as described below.

At block 432, remote server 110 may receive the command/new dwell time rate of change, and/or change in threshold level(s), from personal communication device 112 and store the new dwell time rate of change, and/or change in threshold level(s), in an associated database in accordance with the particular motion detector 102 identified by personal communication device 112. Remote server 110 may then forward the new dwell time rate of change, and/or change in threshold level(s), to motion detector 102.

At block 434, processor 200 receives the command/new dwell time rate of change, and/or change in threshold level(s), via transmitter 206 (in this case, again, transmitter 206 additionally comprises a receiver). Processor 200 may determine that the command comprises an instruction to change a current dwell time rate of change, and/or change in threshold level(s), stored in memory 202 with the new dwell time rate of change by comparing the command to a plurality of commands, such as a command to change the dwell time rate of change, and/or change in threshold level(s), a command to reset motion detector 102, a command to provide the status of motion detector 102, a command to enter into a walk test mode of operation from a normal mode of operation, or other commands. When processor 200 determines that the command is a command to change the dwell time rate of change, and/or change in threshold level(s), processor 200 stores the new dwell time rate of change, and/or change in threshold level(s), in memory 202 in place of the previous dwell time rate of change, and/or change in threshold level(s). Thereafter, processor 200 may use the new dwell time rate of change to change, and/or change in threshold level(s), the dwell time, as explained above.

At block 436, processor 200, or the app running on personal communication device 112, may determine a remaining or expected battery life for the battery(ies) that power motion detector 102 in response to changing the dwell time rate of change or change in threshold level(s). In one embodiment, processor 200 measures a voltage of the battery(ies) as motion detector 200 transmits a signal, as current is drawn from the battery(ies) during transmission. The voltage level may be compared to an expected battery voltage when the battery(ies) are new, and the deviation from the expected battery voltage indicates a remaining battery life.

In another embodiment, memory 202 may receive a standard battery life of motion detector 102 via remote server 110 at some point during a setup process, identifying an expected battery life for a particular make and/or model of motion detector 102 at a default dwell time, and a default dwell time rate of change. As the dwell time rate of change is increased from the default dwell time rate of change, processor 200 may estimate the remaining or expected battery life, based on the default battery life and the new dwell time rate of change. For example, if the expected battery life of motion detector 102 is 36 months using a dwell time rate of change of 1 minute of dwell time change each time the activity level exceeds 1 detection every two minutes, processor 200 may determine an estimated or expected battery life of 48 months, depending on factors such as the amount of power consumed by motion detector 102 during transmission "movement detected" signals and the number of expected transmissions given that an increase of the dwell time rate of change will typically result in fewer transmissions, resulting in an increase to battery life, as opposed to a greater number of "movement detected" signals when the dwell time rate of change is decreased.

At block 438, processor 200 may transmit the remaining or expected battery life to remote server 110 and/or personal communication device 112 via transmitter 206.

At block 440, processor 300 in personal communication device receives the remaining battery life and may store the remaining battery life in memory 302.

At block 442, processor 300 may display the remaining battery life to the user via user interface 304.

At block 444, the user may choose to again modify the dwell time rate of change, or change in threshold level(s), if the user determines that the expected or remaining battery life is unacceptable to the user, based on the change previously submitted. In one embodiment, when the user enters a desired, new dwell time rate of change, the desired, new dwell time may not be implemented by motion detector 102 until the app running on personal communication device 112, or motion detector 102, calculates the expected or remaining battery and displays it to the user for approval. Upon approval from the user, the desired, new dwell time rate of change, and/or change in threshold level(s), is implemented by motion detector 102

Therefore, having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

What is claimed is:

1. A motion detector, comprising:
   a detector for detecting a presence of a person in an area;
   a memory for storing processor-executable instructions and a dwell time, the dwell time comprising a time period during which "motion detection" signals from the motion detector are disabled;
a transmitter for transmitting the motion detection signals; and
a processor coupled to the detector, the memory and the transmitter, for executing the processor-executable instructions that causes the motion detector to:
determine movement in the area over time;
automatically adjust the dwell time to a new dwell time based on the detected movement in the area over time; and
store the new dwell time in the memory for use in deciding whether or not to transmit subsequent motion detection signals.

2. The motion detector of claim 1, wherein the processor-executable instructions further comprise instructions that causes the motion detector to:
determine that no movement has been detected for a time greater than a first predetermined time period;
wherein the processor-executable instructions that causes the motion detector to automatically adjust the dwell time comprises instructions that causes the motion detector to decrease the dwell time by a first predetermined amount when no movement has been detected for a time greater than the first predetermined time period.

3. The motion detector of claim 1, wherein the processor-executable instructions that causes the motion detector to determine movement in the area over time comprise further instructions that causes the motion detector to:
determine that movement has been detected at least twice with a first predetermined time period;
wherein the processor-executable instructions that cause the motion detector to adjust the dwell time comprises instructions that causes the motion detector to increase the dwell time by a second predetermined amount when movement has been detected at least twice within the first predetermined time period.

4. The motion detector of claim 3, wherein the second predetermined time period and the first predetermined time period are equal in time to each other.

5. The motion detector of claim 1, wherein the processor-executable instructions that causes the motion detector to automatically adjust the dwell time to a new dwell time comprise further instructions that causes the motion detector to:
continuously increase the dwell time at a first predetermined rate so long as no movement is detected.

6. The motion detector of claim 1, wherein the processor-executable instructions that causes the motion detector to automatically adjust the dwell time to a new dwell time comprise further instructions that causes the motion detector to:
continuously decrease, by the processor, the dwell time at a first predetermined rate as long as movement is detected.

7. The motion detector of claim 1, wherein the processor-executable instructions that causes the motion detector to automatically adjust the dwell time to a new dwell time comprise further instructions that causes the motion detector to:
limit the new dwell time to a predetermined minimum dwell time.

8. The motion detector of claim 1, wherein the processor-executable instructions that causes the motion detector to automatically adjust the dwell time to a new dwell time comprise further instructions that causes the motion detector to:
limit the new dwell time to a predetermined maximum dwell time.

9. The motion detector of claim 1, wherein the processor-executable instructions that causes the motion detector to determine movement in the area over time comprise further instructions that causes the motion detector to:
count a number of times that movement is detected over a predetermined time frame.

10. The motion detector of claim 1, wherein the processor-executable instructions that causes the motion detector to determine movement in the area over time comprise further instructions that causes the motion detector to:
calculate an activity level based on the movement in the area over time; and
assign a value to the activity level;
wherein the processor-executable instructions that causes the motion detector to automatically adjust the dwell time to a new dwell time comprise further instructions that causes the motion detector to:
automatically adjust the dwell time to the new dwell time when the value of the activity level exceeds a predetermined threshold.

11. A method for automatically adjusting a dwell time of a motion sensor, comprising:
determining movement in the area over time;
automatically adjusting the dwell time to a new dwell time based on the detected movement in the area over time; and
storing the new dwell time for use in deciding whether or not to transmit subsequent motion detection signals.

12. The method of claim 11, further comprising:
determining that no movement has been detected for a time greater than a first predetermined time period;
wherein automatically adjusting the dwell time comprises decreasing the dwell time by a first predetermined amount when no movement has been detected for a time greater than the first predetermined time period.

13. The method of claim 11, wherein determining movement in the area over time comprises:
determining that movement has been detected at least twice with a first predetermined time period; and
adjusting the dwell time comprises increasing the dwell time by a second predetermined amount when movement has been detected at least twice within the first predetermined time period.

14. The method of claim 13, wherein the second time predetermined period and the first predetermined time period are equal in time to each other.

15. The method of claim 11, wherein automatically adjusting the dwell time to a new dwell time comprises:
continuously increasing the dwell time at a first predetermined rate so long as no movement is detected.

16. The method of claim 11, wherein automatically adjusting the dwell time to a new dwell time comprises:
continuously decreasing the dwell time at a first predetermined rate as long as movement is detected.

17. The method of claim 11, wherein automatically adjusting the dwell time to a new dwell time comprises:
limiting the new dwell time to a predetermined minimum dwell time.

18. The method of claim 11, wherein automatically adjusting the dwell time to a new dwell time comprises:
limiting the new dwell time to a predetermined maximum dwell time.

19. The method of claim 11, wherein determining movement in the area over time comprises:
   counting a number of times that movement is detected over a predetermined time frame.

20. The method of claim 11, wherein determining movement in the area over time comprises:
   calculating an activity level based on the movement in the area over time; and
   assigning a value to the activity level;
   wherein automatically adjusting the dwell time to a new dwell time comprises:
   adjusting the dwell time to the new dwell time when the value of the activity level exceeds a predetermined threshold.

* * * * *